US012253041B1

(12) United States Patent
Marrack et al.

(10) Patent No.: US 12,253,041 B1
(45) Date of Patent: Mar. 18, 2025

(54) ENGINE PARASITIC LOADING STRATEGY USING FUEL PRESSURIZATION

(71) Applicant: Caterpillar Inc., Peoria, IL (US)

(72) Inventors: Andrew O. Marrack, Peoria, IL (US); Lifeng Wang, Dunlap, IL (US); Satya Naga Deepak Pillarisetti, Normal, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/535,083

(22) Filed: Dec. 11, 2023

(51) Int. Cl.
*F02D 41/30* (2006.01)

(52) U.S. Cl.
CPC ......... *F02D 41/3005* (2013.01); *F02D 41/30* (2013.01)

(58) Field of Classification Search
CPC ............................. F02D 41/3005; F02D 41/30
See application file for complete search history.

(56) References Cited

U.S. PATENT DOCUMENTS 5,622,152 A 4/1997 Ishida
5,697,343 A 12/1997 Isozumi et al.
7,063,072 B2 6/2006 Persson et al.
7,201,127 B2 4/2007 Rockwell et al.
9,816,475 B1 * 11/2017 Buchanan ........... F02N 11/0866
10,718,289 B2 7/2020 Surnilla et al.
10,760,513 B1 * 9/2020 Huhn .................. F02D 41/1446
10,830,194 B2 11/2020 Shafer et al.
2008/0092853 A1 4/2008 Harcombe et al.
2008/0149741 A1 6/2008 Remmelgas
2012/0204548 A1 * 8/2012 Turnis ..................... E02F 9/226 60/459
2012/0220426 A1 * 8/2012 Klousia ................. E02F 9/2253 477/115
2014/0216403 A1 * 8/2014 Stockner ................ F02M 69/08 123/445
2014/0238340 A1 * 8/2014 Dunn .................. F02D 19/0642 123/299
2014/0283764 A1 * 9/2014 Abou-Nasr ............. F01P 7/162 123/41.47
2016/0319976 A1 * 11/2016 Gardner .............. F16H 57/0435
2019/0113008 A1 * 4/2019 Park ..................... F02D 13/0203
2020/0291905 A1 * 9/2020 Revach .................. F02M 26/28
2020/0386171 A1 * 12/2020 Coldren ............... F02M 59/265

* cited by examiner

*Primary Examiner* — Joseph J Dallo
(74) *Attorney, Agent, or Firm* — Brannon Sowers & Cracraft PC

(57) ABSTRACT

Operating an engine system includes cold starting an engine, closing spill valves to pressurize fuel in a plurality of plunger cavities, opening injection valves in some of a plurality of fuel injectors to inject fuel into firing cylinders in an engine cycle, and opening spill valves in some of the plurality of fuel injectors while injection valves therein remain closed to bleed fuel to a lower pressure space in the engine cycle. The pressurization of fuel in the fuel injectors remaining closed parasitically loads the engine to increase a fuel burned amount hastening warm up and limiting misfire. Related apparatus and control logic is also disclosed.

17 Claims, 4 Drawing Sheets

ENGINE PARASITIC LOADING STRATEGY USING FUEL PRESSURIZATION

TECHNICAL FIELD

The present disclosure relates generally to operating an engine system, and more particularly to parasitically loading an engine via pressurization of fuel without injection during cold starting conditions.

BACKGROUND

Internal combustion engines are used throughout the world for diverse purposes ranging from operating a driveline in a vehicle to powering pumps, compressors, and electrical generators. For heavy-duty applications compression-ignition diesel engines are commonly employed. Essentially all internal combustion engines operate on some version of a basic cycle of controlled combustion of fuel in a cylinder to create a rapid temperature and pressure increase that drives a piston coupled to a rotatable crankshaft.

When an engine is started to initiate this cycle it is generally necessary to rotate parts in the engine by way of an external mechanism such as a starter motor. Coupled with the necessary actuation of moving parts in the engine is the necessity of starting the combustion process. In many cases, and especially with regard to compression-ignition engines, when the engine is cold fuel cannot simply be delivered into the engine and ignited with sufficient reliability. Cold metallic surfaces forming engine cylinders, for example, can have a tendency to quench nascent combustion flames. Various strategies have been proposed over the years for achieving initial ignition of fuel in the cylinders and thereafter sustaining combustion. One example engine startup operating mode is set forth in U.S. Pat. No. 7,201,127 B2 to Rockwell et al. The art provides ample opportunity for improvements and/or alternative strategies.

SUMMARY

In one aspect, a method of operating an engine system includes cold starting an engine, moving a plurality of plungers in a plurality of plunger cavities between advanced positions and retracted positions, and closing a plurality of spill valves each positioned fluidly between one of the plurality of plunger cavities and a low-pressure space to pressurize a fuel in each of the plurality of plunger cavities. The method further includes opening a first injection valve in a first fuel injector to inject fuel pressurized by a first one of the plurality of plungers into a firing cylinder of the engine in an engine cycle, and opening one of the plurality of spill valves in a second fuel injector while a second injection valve in the second fuel injector remains closed so as to bleed fuel pressurized by a second one of the plurality of plungers to the low-pressure space in the engine cycle. The method still further includes parasitically loading the engine via the pressurization of fuel by the second one of the plurality of plungers.

In another aspect, an engine system includes an engine having an engine housing with a plurality of cylinders therein, and a fuel system having a first fuel injector and a second fuel injector each including a plunger within a plunger cavity, an injection valve, and an electrically actuated spill valve. The fuel system defines a low-pressure space. The engine system further includes a parasitic loading control unit structured to command closing the spill valve in the first fuel injector to pressurize a fuel in the corresponding plunger cavity, and to command closing the spill valve in the second fuel injector to pressurize the fuel in the corresponding plunger cavity. The parasitic loading control unit is further structured to command opening the injection valve in the first fuel injector in an engine cycle to inject the pressurized fuel from a corresponding plunger cavity into a firing cylinder of the plurality of cylinders in the engine, and to command opening the spill valve in the second fuel injector in the engine cycle while the injection valve in the second fuel injector remains closed so as to bleed the pressurized fuel from the corresponding plunger cavity to the low-pressure space.

In still another aspect, a fuel system includes a parasitic loading control unit structured for control communication with each of a plurality of electrically actuated spill valves and a plurality of injection valves, of a plurality of fuel injectors in a fuel system. The parasitic loading control unit is further structured to command closing the plurality of spill valves to pressurize a fuel in a plurality of plunger cavities of the plurality of fuel injectors, and to command opening the injection valves of a firing group of the plurality of fuel injectors to inject the pressurized fuel into a plurality of firing cylinders in an engine. The parasitic loading control unit is still further structured to command opening the spill valves of a non-firing group of the plurality of fuel injectors while the corresponding injection valves remain closed to parasitically load the engine during cold starting.

DETAILED DESCRIPTION

Figure 1:
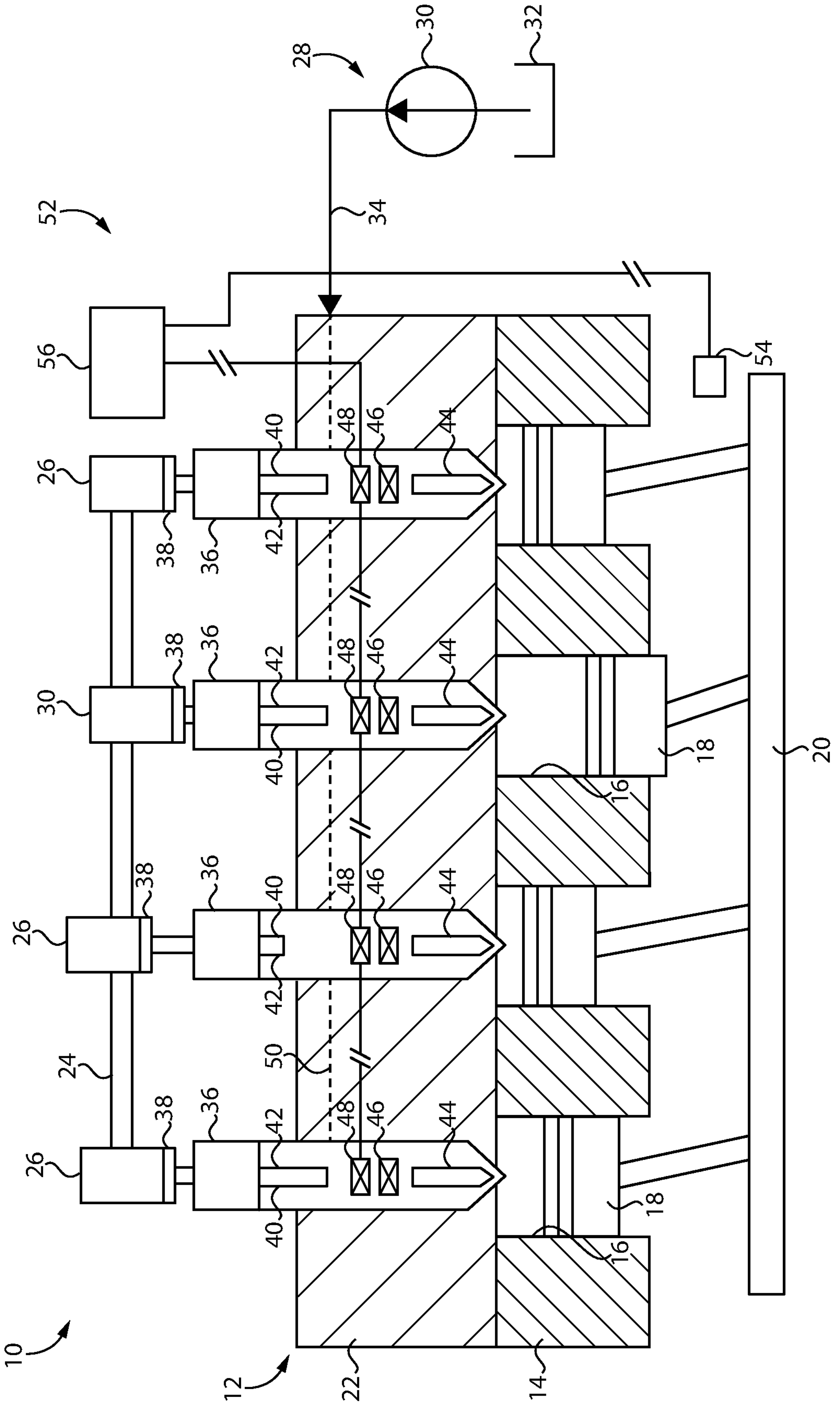
FIG. 1 is a diagrammatic view an engine system, according to one embodiment.

Referring to FIG. 1, there is shown an internal combustion engine system 10, according to one embodiment. Engine system 10 includes an engine 12 having an engine housing 14 including a plurality of combustion cylinders 16 formed therein. A plurality of pistons 18 are movable within cylinders 16 between a top-dead-center position and a bottom-dead-center position. Pistons 18 are coupled to a crankshaft 20 in a generally conventional manner. Cylinders 16 can include any number greater than one and may be in any suitable arrangement such as an inline pattern, a V-pattern, or still another. Cylinders 16 may be arranged physically and/or functionally into a first cylinder bank and a second cylinder bank. In one embodiment, a first cylinder bank and a second cylinder bank could be arranged upon opposite sides of a V-pattern. First and second cylinder banks could also include the first few cylinders and the second few cylinders, respectively, in an inline configuration, alternating cylinders in an inline configuration, or still another arrangement. Engine 12 can include a four-stroke compression-ignition engine operated on a suitable compression-ignition liquid fuel, such as a diesel distillate fuel. In other implementations, engine 12 could be spark-ignited, prechamber-ignited, pilot fuel-ignited in a dual fuel strategy, or still others. Engine 12 may be operable to power a load such as a driveline in a vehicle, a pump, a compressor, or still others.

Engine system 10 also includes a camshaft 24 having a plurality of cams 26, and rotatable at one-half engine speed by way of a geartrain (not shown) coupled to crankshaft 20 in a generally conventional manner. Engine system 10 also includes a fuel system 28. Fuel system 28 may include a pump 30 structured to convey a fuel, such as a diesel fuel, from a fuel supply 32 to a plurality of fuel injectors 36 by way of a fuel supply conduit 34. Fuel injectors 36 may be supported in an engine head 22 attached to engine housing or cylinder block 14. In an implementation, fuel supply conduit 34 extends through engine head 22 to provide a supply of fuel at a low-pressure simultaneously to each of fuel injectors 36. Other embodiments could include a top feed of fuel to individual fuel injectors, or some other fuel supply strategy. A drain or return conduit (not shown) can return drained fuel from engine head 22 to fuel supply 32 in some embodiments. Each of fuel injectors 36 includes a tappet 38 contacted directly by one of cams 26 or by way of a rocker arm (not shown) contacted directly by one of cams 26.

For purposes of the present description fuel system 28 may be understood to include a first fuel injector 36 and a second fuel injector 36 which may be any two fuel injectors in fuel system 28, and as further discussed herein a first fuel injector in a first group of fuel injectors 36 and a second fuel injector in a second group of fuel injectors 36. The first group may be a firing group, at times, and a non-firing group, at times. The second group may likewise be a firing group, at times, and a non-firing group, at times. The first group may include fuel injectors associated with firing cylinders in a first bank of cylinders, and the second group may include non-firing cylinders in a second bank of fuel injectors. The listed groupings and firing versus non-firing functionality may be switched during service, such as during cold starting, as also further discussed herein.

Each of the plurality of fuel injectors 36, referred to at times in the singular, maybe be interchangeable for service in fuel system 28. Fuel injector 36 includes a plunger 40 within a plunger cavity 42. Plunger 40 may be coupled with tappet 38 and movable in response to rotation of the associated cam 26 between an advanced position and a retracted position within the corresponding plunger cavity 42. In other embodiments, a plunger and plunger cavity may be situated externally to a fuel injector. Moreover, embodiments are contemplated where one plunger pressurizes fuel for multiple fuel injectors.

Fuel injector 36 further includes an injection valve 44. Injection valve 44 is movable to controllably start, stop, and potentially vary a fuel injection rate shape of fuel injection into a corresponding one of cylinders 16. Fuel injector 36 also includes an injection control valve 46. An "injection valve" as contemplated herein means a valve that controls fuel injection. Accordingly, either of an outlet check or needle valve, approximately as injection valve 34 is illustrated in FIG. 1, or an injection control valve that controls a corresponding outlook check or needle valve, could be considered an injection valve for purposes of the present description.

Fuel injector 36 further includes an electrically actuated spill valve 48, also further discussed herein. Fuel system 28 further defines a low-pressure space 50. A low-pressure space as contemplated herein means a physical cavity, conduit, passage, et cetera that has a low pressure, at least at times, relative to a higher pressure within a fuel injector. Accordingly, low-pressure space 50 can include an internal fuel supply conduit within engine head 22, a drain conduit, or some other cavity, void, et cetera, including within an individual fuel injector.

Engine system 10 also includes a control system 52. Control system 52 may include a variety of sensors, electrical actuators, and other electrical or electronic components in or associated with fuel system 28. As illustrated in FIG. 1, control system 52 includes a crank angle timing sensor 54 operatable to produce data indicative of a crank angle timing of engine 12 used in control system 52 to perform control aspects of the present disclosure at desired engine crank angle timings, as also further discussed herein. Control system 52 further includes a fueling control unit 56. Fueling control unit 56 is described hereinafter as a parasitic loading control until 56 that is structured to selectively parasitically load engine system 10, for purposes such as hastening engine warm up and/or inhibiting misfire during a cold start. Parasitic loading may be effected prior to and until engine system 10 reaches a low idle engine speed, for example.

Parasitic loading control unit 56 may include any suitable programmable logic unit, such as a microprocessor or a microcontroller, and a computer readable volatile or non-volatile memory such as RAM, ROM, flash, or any one or more of many others storing computer executable program instructions, maps, tables, et cetera. The features and functionality of parasitic loading control unit 56 are further discussed below.

Figure 2:
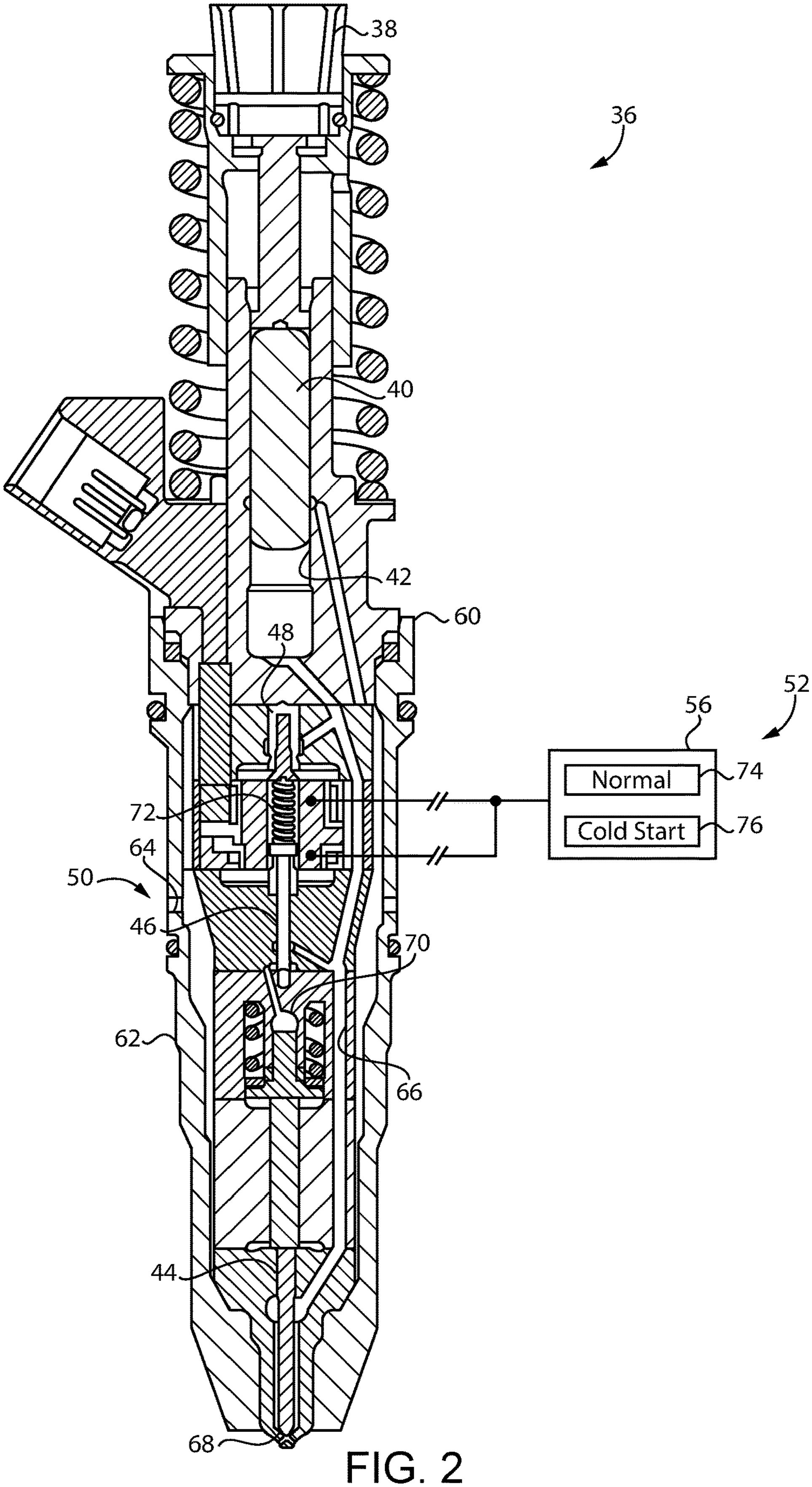
FIG. 2 is a sectioned side diagrammatic view of a fuel system, according to one embodiment.

Referring also now to FIG. 2, there are shown additional features of fuel injector 36 in further detail. Fuel injector 36 includes an injector housing 60 having a casing 62 that may be positioned within engine head 22, such that fuel injector 36 includes a direct injector that extends into a corresponding one of cylinders 16 for direct injection of fuel. Casing 62 includes at least one fuel inlet 64 formed therein that receives a feed of fuel at a low pressure by way of fuel supply conduit 34. Plunger 40 is also shown within injector housing 60 and movable at least partially within plunger cavity 42 as discussed above, to a retracted position to draw fuel into plunger cavity 42 via fuel inlet 64, and to an advanced position to pressurize the fuel for injection, or to expel the fuel back through fuel inlet 64 to low-pressure space 50. As noted above, fuel injector 36 includes electrically actuated spill valve 48. Spill valve may be within injector housing 60 or potentially positioned externally in some embodiments. Spill valve 48 may be movable between a full open position where reciprocation of plunger 40 passively exchanges fuel with low-pressure space 50, and a full closed position where plunger cavity 42 is blocked from low-pressure space 50 and plunger 40 advances to pressurize fuel and supply the same by way of a nozzle passage 66 to nozzle outlets 68.

Injection valve 44 is movable to open and close nozzle outlets 68 to control fuel injection. Fuel injector 36 also includes therein a control chamber 70 that is fluidly connected to nozzle passage 66. When high pressure prevails in nozzle passage 66 a closing hydraulic pressure can be applied to injection valve 44 in hydraulic control chamber 70 so long as control valve 46 is closed. When control valve 46 is opened control chamber 70 will be connected to low-pressure space 50 allowing high pressure from nozzle passage 66 to urge open injection valve 44. Each of spill valve 48, injection valve 44, and control valve 46 may be of a known design. A biasing spring 72 is positioned operably between spill valve 48 and control valve 46. Biasing spring 72 may bias control valve 46 toward a closed position, and bias spill valve 48 toward an open position. Separate springs could be used in some embodiments. Energizing an electrical solenoid actuator for control valve 46 causes control valve 46 to open in opposition to a closing bias of biasing spring 72. Energizing a solenoid electrical actuator for spill valve 48 causes spill valve 48 to close in opposition to an opening bias of biasing spring 72.

Also shown in FIG. 2 are features of control system 52, including normal operating software or control logic 74, and cold start software or control logic 76. Parasitic loading control unit 56 may be part of a fueling control unit as discussed above that operates fuel system 28 under all conditions including "normal" conditions as well as cold start conditions. Cold start conditions as contemplated herein mean a starting condition where engine system 10 is transitioned from not operating or OFF to operating or ON. Thus, cold start does not necessarily require that engine system 10 be cold in temperature, merely first started such as by turning an ignition key or actuating a start button after having been turned off.

As suggested above, cold starting an internal combustion engine, and in a particular case starting a compression-ignition diesel engine, can be associated with certain challenges. One challenge has been observed for many years to be a likelihood of misfire of at least some of the cylinders. Misfiring cylinders can increase the time that it takes an engine system to warm up and reach a stable operating state, such as a low idle engine speed, as well as potentially causing other problems relating to combustion control and/or emissions. In many applications it can be desirable to minimize starting time, and thus often desirable to transition an engine to a stable operating state such as a low idle engine speed as quickly as practicable. It has been discovered that parasitically loading engine system 10 during cold starting can temporarily increase a fuel burned amount per cylinder by adding load to engine 12 to more rapidly increase temperature and inhibit misfire. Control system 52 may generally be structured with these and other goals in mind.

To this end, parasitic loading control unit 56 may be structured to command closing a spill valve 48 in a first fuel injector 36 to pressurize a fuel in the corresponding plunger cavity 42, and to command closing a spill valve 48 in a second fuel injector 36 to pressurize the fuel in the corresponding plunger cavity 42. Parasitic loading control until 56 may be further structured to command opening an injection valve 44 in the first fuel injector 36 in an engine cycle to inject the pressurized fuel from the corresponding plunger cavity 42 into a firing cylinder of the plurality of cylinder 16 in engine 12. Parasitic loading control unit 56 may also be structured to command opening the spill valve 48 in the second fuel injector 36 in the engine cycle while the injection valve 44 in the second fuel injector 36 remains closed so as to bleed the pressurized fuel from the corresponding plunger cavity 42 to low-pressure space 50.

The foregoing description focuses on a case where one fuel injector is used to inject fuel into a firing cylinder wherein the fuel is combusted to produce output power of engine 12 by rotating crankshaft 20, and another fuel injector pressurizes fuel but bleeds off or dumps the fuel pressure back to low-pressure space 50. In this way, engine 12 can be thought of as being required to perform the work of pressurizing fuel for two fuel injections, but only realizing the combustion energy output from one of those fuel pressurizations.

As a result, engine system 10 is parasitically loaded by the non-firing cylinder, requiring the firing cylinders to increase fuel injection amount and fuel burned amount to satisfy the load requirements of engine 12. In a practical implementation, rather than employing the present practice for only two fuel injectors, control system 52 will typically utilize multiple firing cylinders fueled by a plurality of fuel injectors in a firing group, and multiple non-firing cylinders associated with a non-firing group of fuel injectors. Thus, the first injection valve 44 discussed above may be one of a plurality of injection valves 44 in a plurality of fuel injectors 36 opened to inject fuel into a plurality of firing cylinders of engine 12 in an engine cycle, and the second injection valve 44 described above may be one of a plurality of injection valves 44 remaining closed so as to bleed fuel pressurized by a plurality of the plurality of plungers 40 to low-pressure space 50 in the same engine cycle. The plurality of injection valves 44 opened to inject fuel may be in a plurality of fuel injectors 36 associated with a plurality of firing cylinders in a first cylinder bank in engine 12, and the plurality of injection valves 44 remaining closed may in a plurality of fuel injectors 36 associated with a plurality of non-firing cylinders in a second cylinder bank in engine 12. Parasitic loading control until 56 may be further structured to switch parasitic loading of engine 12 from the second cylinder bank to the first cylinder bank in a second engine cycle. Analogously, parasitic loading control unit 56 may be understood as structured to parasitically load engine 12 via the second fuel injector in a first engine cycle, and via the first fuel injector in a second engine cycle.

Figure 3:
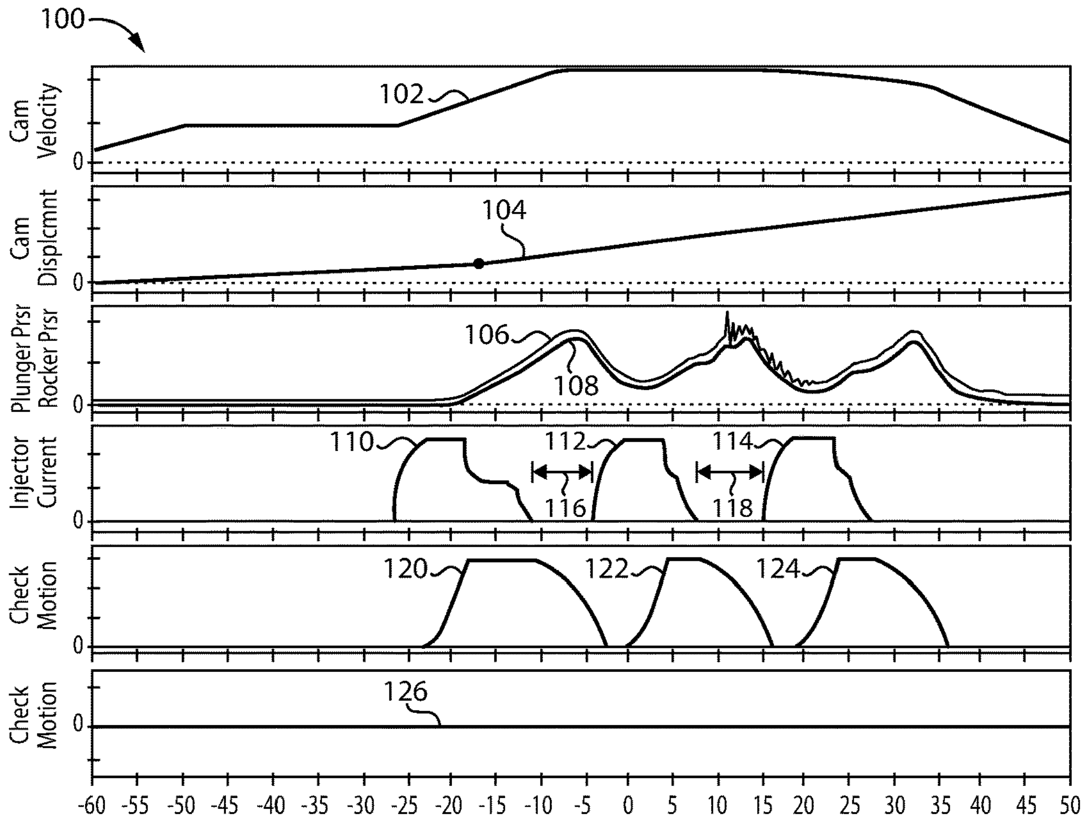
FIG. 3 is a graph of fuel system events and states during a crank angle timing period.

Referring also now to FIG. 3, there is shown a graph 100 illustrating engine and fuel system events and states in an engine cycle, over a range of crank angle degrees shown on the X-axis. A cam velocity is shown at 102. A cam displacement (Cam Displcment) is shown at 104. Numeral 106 shows plunger pressure (Plunger Prsr), and 108 shows rocker pressure (Rocker Prsr). As will be recalled, FIG. 1 illustrates cams 26 contacting tappets 38. It should be appreciated that cams 26 might rotate in contact with rocker arms that are in turn coupled to tappets 38.

Numerals 110, 112, and 114 show injector currents. Injector currents 110, 112, and 114 may include electrical control currents or commands produced by parasitic loading control unit 56 and used to energize a solenoid actuator of spill valve 48. In an embodiment, parasitic loading control unit 56 may be structured to command reclosing and reopening spill valve 48 so as to bleed pressurized fuel in a plurality of pulses in an engine cycle. In the illustrated embodiment, the plurality of pulses includes three pulses. Other embodiments could include two pulses, one pulse, or more than three pulses. Thus, according to the example illustrated in FIG. 3 parasitic loading control unit 56 energizes the solenoid actuator of spill valve 48 three separate times. Numerals 120, 122, and 124 show spill valve motion occurring in response to the pulses of injector current 110, 112, 114. It can be observed that pulses 110, 112, and 114 are not exactly the same. Pulse 110 has a longer duration. A dwell time 118 between pulse 112 and pulse 114 may be longer than a dwell time 116 between pulse 110 and pulse 112.

Those skilled in the art will appreciate the possibility of over-pressurizing a fuel injector by advancing a plunger within a plunger cavity to pressurize fuel while a spill valve is closed and an injection valve remains closed. Parasitic loading control unit 56 may operate to inhibit over-pressurizing the subject fuel injector by controllably opening and then reclosing spill valve 48 to prevent damage or performance degradation that could result from over-pressurization. Inhibiting over-pressurizing the subject fuel injector 36 may be based on at least one of a pulse duration, a pulse number, or a pulse-pulse dwell time of a plurality of pulses. Numeral 126 shows check motion, illustrating the associated injection valve remains closed. It can also be noted from FIG. 3 that the plurality of pulses occur during an ascending portion of cam displacement profile 104 of a cam coupled to a tappet coupled to the plunger of the subject fuel injector.

Figure 4:
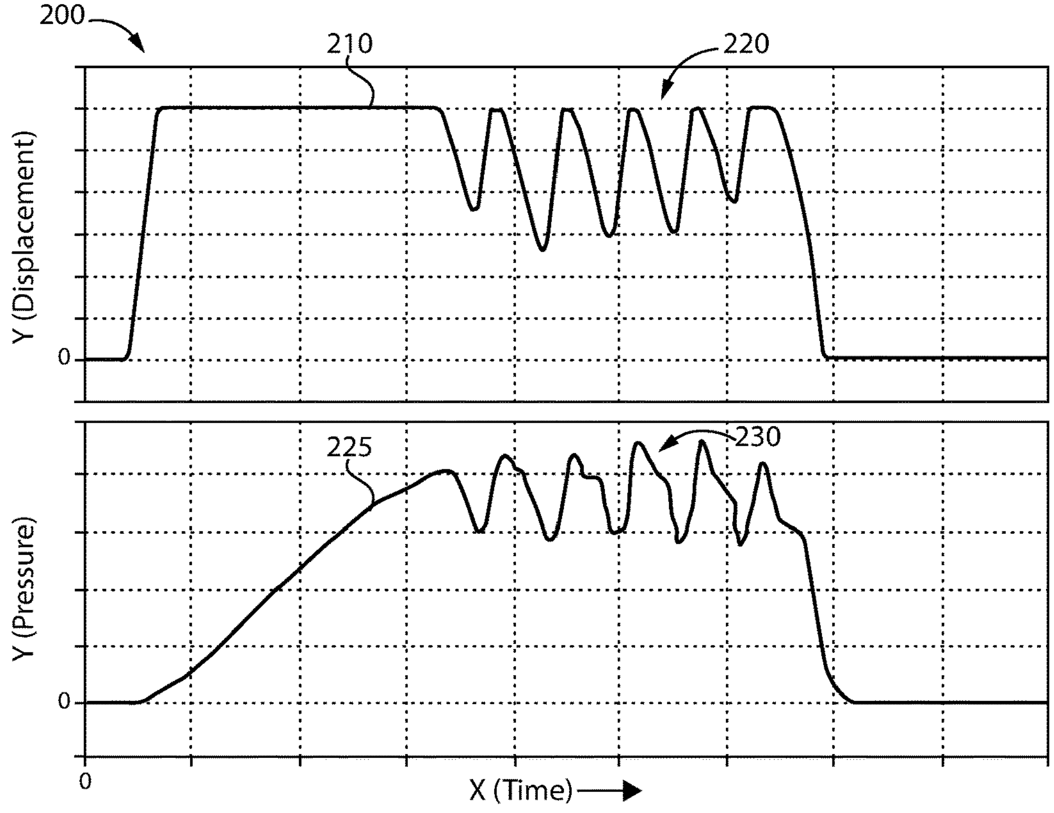
FIG. 4 is a graph of valve displacement and fuel pressure over time.

Referring also now to FIG. 4, there is shown a graph 200 illustrating spill valve displacement at 210 and fuel pressure at 225 over time. It can be noted from FIG. 4 that a plurality of pulses 220 are evident in spill valve displacement 210, and a plurality of pulses 230 are evident in fuel pressure 225. It is contemplated that in many instances it would be desirable to fit as many pulses of fuel pressure relief into an engine cycle as is practicable, for as long as is practicable, to maximize parasitic loading whilst inhibiting over-pressurization.

INDUSTRIAL APPLICABILITY

Figure 5:
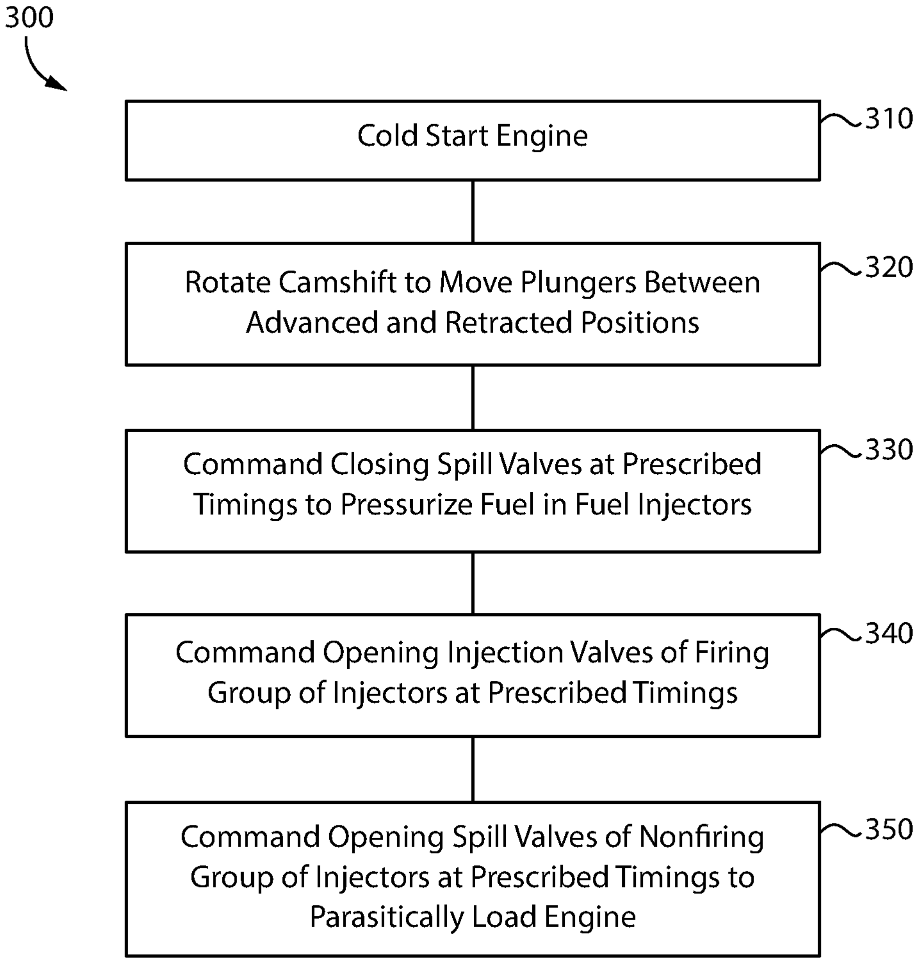
FIG. 5 is a flowchart illustrating example methodology and logic flow, according to one embodiment.

Referring to the drawings generally, but focusing now on FIG. 5, there is shown a flowchart 300 illustrating example methodology and logic flow. At a block 310 engine 12 is cold started, meaning engine 12 is turned on and crankshaft 20 is made to rotate such as by way of a starter motor coupled to an associated geartrain. At a block 320 camshaft 24 is rotated to move plungers 42 between advanced and retracted positions, in each of fuel injectors 36. From block 320 flowchart 300 advances to a block 330 to command closing spill valves 48 at prescribed timings to pressurize fuel in fuel injectors 36. Since each of cylinders 16 will have a different phasing of associated components, the commanded closing of spill valves 48 will generally occur at different times.

From block 330 flowchart 300 advances to a block 340 to command opening injection valves 44 of a firing group of injectors 36 at prescribed timings to inject fuel into the associated cylinders 16 for combustion. From block 340 flowchart 300 advances to a block 350 to command opening spill valves 48 of the non-firing group of injectors 36 at prescribed timings to parasitically load engine 12. It will be appreciated that the commanded opening of injection valves and the commanded opening of spill valves may have different timings or even overlapping timings and thus do not occur simultaneously.

As also discussed herein, once a cylinder bank of engine 12 has been used to parasitically load the engine for a predefined time such as a predefined number of engine cycles, the control can switch to utilize another cylinder bank to parasitically load engine 12 for a prescribed timing such as a number of engine cycles. The control could also switch back from the another cylinder bank to the first cylinder bank, transition to a third cylinder bank, or transition among any number of cylinders and associated fuel injectors in any pattern, to selectively parasitically load engine 12. When engine system 10 has warmed up, such as by reaching a low idle speed or even prior to that, the logic executed for cold start operation can exit and normal operation proceeds.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of operating an engine system comprising:

cold starting an engine;

moving a plurality of plungers in a plurality of plunger cavities between advanced positions and retracted positions;

closing a plurality of spill valves each positioned fluidly between one of the plurality of plunger cavities and a low-pressure space to pressurize a fuel in each of the plurality of plunger cavities;

opening a first injection valve in a first fuel injector to inject fuel pressurized by a first one of the plurality of plungers into a firing cylinder of the engine in an engine cycle;

opening one of the plurality of spill valves in a second fuel injector while a second injection valve in the second fuel injector remains closed so as to bleed fuel pressurized by a second one of the plurality of plungers to the low-pressure space in the engine cycle;

parasitically loading the engine via the pressurization of fuel by the second one of the plurality of plungers; and reclosing and then reopening the one of the plurality of spill valves while the second injection valve remains closed, so as to bleed the fuel pressurized by the second one of the plurality of plungers in a plurality of pulses, and the plurality of pulses are varied with respect to at least one of pulse duration or pulse-pulse dwell time.

2. The method of claim 1 wherein:

the moving a plurality of plungers includes moving the plurality of plungers via a plurality of tappets in contact with a plurality of cams on a camshaft of the engine; and the parasitically loading the engine occurs during the cold starting the engine and prior to transitioning the engine to a low idle engine speed.

3. The method of claim 1 wherein the first injection valve is one of a plurality of injection valves in a plurality of fuel injectors opened to inject fuel into a plurality of firing cylinders of the engine in the engine cycle, and the second injection valve is one of a plurality of injection valves remaining closed so as to bleed fuel pressurized by a plurality of the plurality of plungers to the low-pressure space in the engine cycle.

4. The method of claim 3 wherein:

the plurality of injection valves opened to inject fuel are in a plurality of direct injectors extending into the plurality of firing cylinders in a first cylinder bank in the engine;

the plurality of injection valves remaining closed are in a plurality of direct injectors extending into a plurality of non-firing cylinders in a second cylinder bank in the engine; and the method further comprises switching parasitic loading of the engine from the second cylinder bank to the first cylinder bank in a second engine cycle.

5. The method of claim 1 wherein the plurality of pulses includes three pulses.

6. The method of claim 1 further comprising inhibiting over-pressurizing the second fuel injector based on at least one of the pulse duration, a pulse number, or the pulse-pulse dwell time of the plurality of pulses.

7. The method of claim 1 wherein each of the closing and the reclosing of the one of the plurality of spill valves includes energizing a spill valve electrical actuator.

8. An engine system comprising:

an engine including an engine housing having a plurality of cylinders therein;

a fuel system including a first fuel injector and a second fuel injector each having a plunger within a plunger cavity, an injection valve, and an electrically actuated spill valve, and the fuel system defining a low-pressure space;

a parasitic loading control unit structured to:

command closing the spill valve in the first fuel injector to pressurize a fuel in the corresponding plunger cavity;

command closing the spill valve in the second fuel injector to pressurize the fuel in the corresponding plunger cavity;

command opening the injection valve in the first fuel injector in an engine cycle to inject the pressurized fuel from the corresponding plunger cavity into a firing cylinder of the plurality of cylinders in the engine;

command opening the spill valve in the second fuel injector in the engine cycle while the injection valve in the second fuel injector remains closed so as to bleed the pressurized fuel from the corresponding plunger cavity to the low-pressure space; and command reclosing and reopening the spill valve in the second fuel injector in the engine cycle so as to bleed the pressurized fuel in a plurality of pulses, and the plurality of pulses are varied with respect to at least one of pulse duration or pulse-pulse dwell time.

9. The engine system of claim 8 wherein the engine is parasitically loaded via the second fuel injector in the engine cycle, and the parasitic loading control unit is further structured to parasitically load the engine via the first fuel injector in a second engine cycle.

10. The engine system of claim 8 wherein the plurality of pulses includes three pulses.

11. The engine system of claim 8 wherein the plurality of pulses occur during an ascending portion of a cam displacement profile of a cam coupled to a tappet coupled to the plunger of the second fuel injector.

12. The engine system of claim 8 wherein the commanded opening of the spill valve in the second fuel injector includes a commanded deenergizing of the spill valve, and the spill valve is commanded to deenergize a plurality of times to produce the plurality of pulses.

13. A fuel system comprising:

a parasitic loading control unit structured for control communication with each of a plurality of electrically actuated spill valves and a plurality of injection valves, of a plurality of fuel injectors in a fuel system;

the parasitic loading control unit being further structured to command closing the plurality of spill valves to pressurize a fuel in a plurality of plunger cavities of the plurality of fuel injectors;

the parasitic loading control unit being further structured to command opening the injection valves of a firing group of the plurality of fuel injectors to inject the pressurized fuel into a plurality of firing cylinders in an engine;

the parasitic loading controller being further structured to command opening the spill valves of a non-firing group of the plurality of fuel injectors while the corresponding injection valves remain closed to parasitically load the engine during cold starting; and the parasitic loading control unit is further structured to pulse the commanded opening of the spill valves to bleed the pressurized fuel to a low-pressure space in a plurality of pulses from each of the plurality of plunger cavities, and each respective plurality of pulses is varied with respect to at least one of pulse duration or pulse-pulse dwell time.

14. The fuel system of claim 13 further comprising the plurality of spill valves each including an electrical actuator and a biasing spring, and wherein each of the plurality of spill valves is movable in opposition to a biasing force of the biasing spring, via energizing the corresponding electrical actuator, to a middle position between a full open position and a full closed position, to produce the plurality of pulses from the corresponding plunger cavity.

15. The fuel system of claim 13 further comprising the plurality of fuel injectors, and at least one camshaft having a plurality of cams coupled to the plurality of plungers.

16. The method of claim 1 wherein the plurality of pulses includes a first pulse having a duration that is longer than that of a second pulse of the plurality of pulses.

17. The method of claim 1 wherein the dwell time between a first pulse and a second pulse is less than a dwell time between the second pulse and a third pulse.

* * * * *